G. F. BELL.
SAND BAILER FOR WELLS.
APPLICATION FILED SEPT. 30, 1915.
1,257,176.
Patented Feb. 19, 1918.
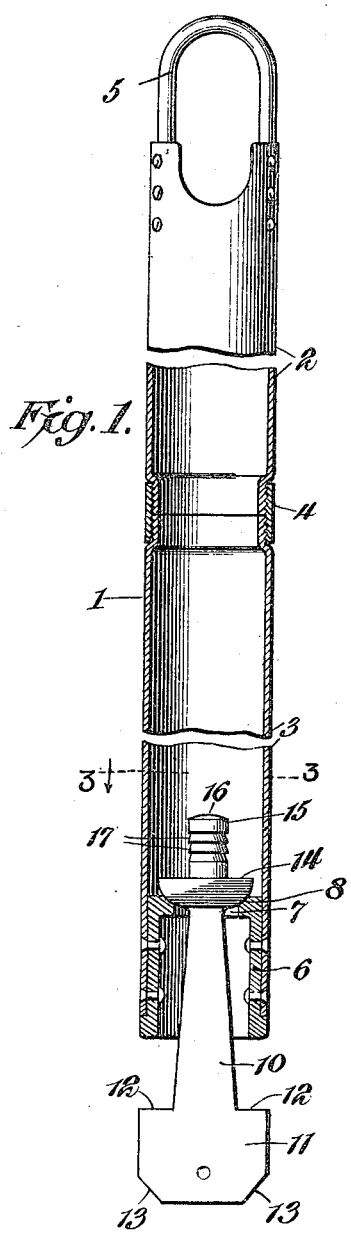
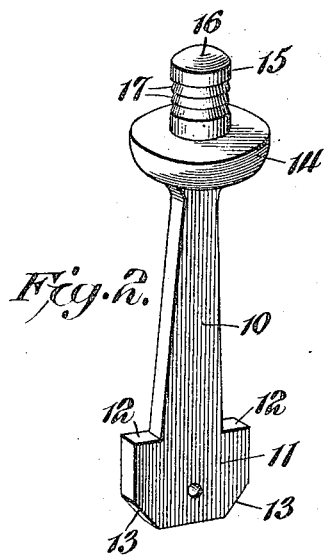
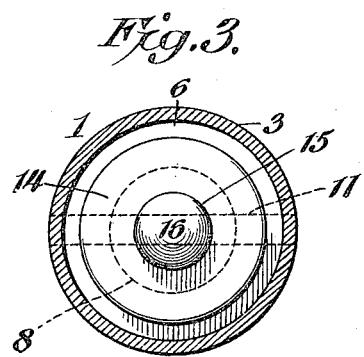
WITNESSES:
Howard D. Orr.
Jas. H. Blackwood
George F. Bell, INVENTOR,
BY E. G. Siggers.
Attorney ated, it is

UNITED STATES PATENT OFFICE.

GEORGE FRANCIS BELL, OF TULSA, OKLAHOMA.

SAND-BAILER FOR WELLS.

1,257,176.

Specification of Letters Patent. Patented Feb. 19, 1918.

Application filed September 30, 1915. Serial No. 53,385.

*To all whom it may concern:*

Be it known that I, GEORGE F. BELL, a citizen of the United States, residing at Tulsa, in the county of Tulsa and State of Oklahoma, have invented a new and useful Sand-Bailer for Wells, of which the following is a specification.

This invention has reference to bailers, commonly known to the trade as "sand-bailers," for use in taking drillings or sand pumpings from gas, oil, Artesian or other wells.

The invention has for its object to provide means for recovering or "fishing out" the bailer from the well when the line breaks, or the bailer gets stuck in the well from any cause.

The average bailer is twenty feet long, and is made of very thin, light material in order to reduce the weight to a minimum. Because of this fact, when the bail on the bailer becomes broken while in the well, and it is necessary to remove the same, it is impossible to use the conventional "bull dog" spear for such purpose, for the reason that it would expand the bailer casing, causing splitting as well as the binding of the casing in the hole. Also, because of the constant hammering of the valve on its seat, the casing very often wears out near the bottom, and the casing being comparatively frail, the jarring from the top under the present methods, frequently jars the casing off, and leaves nothing but the bottom in the hole.

When a crooked hole is encountered in fishing for the bailer under present conditions, with the pull on the bailer from the top, the bailer binds against the curved or crooked walls to such an extent as to invariably cause the breaking of the sand line with the attendant evils.

By the use of the present invention, it will be readily apparent that the bailer is recovered by gripping it at the lower end, the upper end being permitted to feel its way clear of any crooked walls. Moreover, when the bottom of the bailer is left in the hole as is sometimes the case it can be readily removed as the engagement of the fishing tool with the bailer is at the bottom.

For the accomplishment of the results stated the invention consists of a neck or projection forged or otherwise provided on the dart valve and of a shape and size to allow the standard fishing tools to catch the same in withdrawing the bailer from the well.

In the drawings:

Figure 1 is a central vertical section of a sand-bailer embodying my invention with the upper portion and bail shown in elevation.

Fig. 2 is a perspective view of the dart valve and projection.

Fig. 3 is a horizontal section on the line 3—3 of Fig. 1 on an enlarged scale.

Referring to the drawings there is shown a sectional sand-bailer provided with a tube or cylinder 1 made in a plurality of sections 2, 3 connected together by means of a screw threaded sleeve 4. The upper section 2 is provided with a bail 5 secured thereto by bolts or other suitable means adapted for use in attaching the sand line thereto; the lower section 3 is provided with a sleeve or thimble 6 secured thereto by bolts or other suitable means and having an opening 7 provided with a valve seat 8 said sleeve being adapted to reinforce the lower portion of the section 3 in addition to serving as a valve support.

The dart valve of the bailer comprises an upwardly tapering flat stem 10 terminating at its lower end in an enlarged flat portion 11 having laterally projecting shoulders 12 and cut away corners 13 and a valve 14. Thus far the construction described is common and well known in the art and no claim is made thereto. The particular improvement which I claim will now be referred to. Extending from the upper face of the valve 14 is a cylindrical projection or lug 15 forged or otherwise formed on the valve, and having a convex upper end 16 and a series of annular downwardly and outwardly inclined undercut ribs or teeth 17, which are adapted for engagement with what is commonly known as a "fishing tool," to provide means for raising the bailer from the well when the sand line breaks or when the bailer becomes stuck in the well from other causes.

Besides the breaking of the sand line, it very often happens that in drilling a well, a cave-in occurs, or the hole is uneven and the sand-bailer becomes stuck. In such cases, a tool known as a "latch jack" is employed in the endeavor to dislodge and recover the sand-bailer, and as this tool frequently jars off or breaks the bail 5, there is nothing left to do (unless the well is to be abandoned) but to try and drill out the bailer, which takes time and is expensive. By the employment of the projection or lug 15 above referred to, such operation is unnecessary.

If by accident the usual means for raising or withdrawing the bailer from the well are put out of commission or destroyed, it is only necessary to engage the projection on the dart valve with a tool, known to the trade as a combination slip socket, when the bailer can be easily raised and withdrawn from the well.

By the present invention it is practically impossible to lose a bailer so as to make its recovery impossible. The projection on the valve permits the use of the slip socket, which can be readily and conveniently handled without any expense or delay, and with positive result.

I do not wish to be understood as limiting myself to the details of construction and arrangement as herein described and illustrated, as it is manifest that variations and modifications may be made in the features of construction and arrangement, in the adaptation of the device to various conditions of use, without departing from the spirit and scope of my invention. I therefore reserve the right to all such variations and modifications as properly fall within the scope of my invention and the terms of the following claim.

What is claimed is:—

In a sand bailer characterized by the employment of a casing having a bail at its upper end, a valve seat near its lower end, and a dart valve within the casing having a depending stem adapted to engage the casing when the valve is moved upwardly, the combination with said valve, of a relatively short axial projection rigid with the valve and provided with a series of annular downwardly and outwardly inclined undercut teeth which are arranged one above another on said projection, said teeth being adapted to be engaged by a fishing tool passed through the upper end of the casing, whereby the bailer is gripped at its lower end leaving the upper end free for the purpose described.

In testimony that I claim the foregoing as my own, I have hereto affixed my signature in the presence of two witnesses.

GEORGE FRANCIS BELL.

Witnesses:
JASON HART,
CHAS. L. TAGUE.

Copies of this patent may be obtained for five cents each, by addressing the "Commissioner of Patents, Washington, D. C."